(12) United States Patent
Wu

(10) Patent No.: US 9,195,346 B2
(45) Date of Patent: Nov. 24, 2015

(54) TOUCH PANEL, TOUCH DEVICE USING THE SAME, AND TOUCH CONTROL METHOD

(71) Applicant: Wistron Corporation, New Taipei (TW)

(72) Inventor: Tung-Ming Wu, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 93 days.

(21) Appl. No.: 14/108,400

(22) Filed: Dec. 17, 2013

(65) Prior Publication Data

US 2014/0347324 A1 Nov. 27, 2014

(30) Foreign Application Priority Data

May 23, 2013 (TW) .............................. 102118147 A

(51) Int. Cl.
*G06F 3/042* (2006.01)
*G06F 3/041* (2006.01)
*G06F 3/03* (2006.01)

(52) U.S. Cl.
CPC ............ *G06F 3/0425* (2013.01); *G06F 3/0304* (2013.01); *G06F 3/0416* (2013.01); *G06F 2203/04109* (2013.01)

(58) Field of Classification Search
CPC ..... G06F 3/042; G06F 3/0421; G06F 3/0425; G06F 3/0428
USPC ....................... 345/102, 103, 175; 349/61–63
See application file for complete search history.

(56) References Cited

U.S. PATENT DOCUMENTS

| 7,798,699 | B2 * | 9/2010 | Laitinen et al. | 349/68 |
| 2008/0029691 | A1 | 2/2008 | Han | |
| 2014/0327623 | A1 * | 11/2014 | Yu et al. | 345/173 |

* cited by examiner

*Primary Examiner* — Regina Liang
(74) *Attorney, Agent, or Firm* — McClure, Qualey & Rodack, LLP

(57) ABSTRACT

A touch panel includes a light guide plate, a light emitting device, a light sensing module, and a controller. The light guide plate has a touch plane. The light emitting device applies an incident light to the light guide plate, and at least a portion of the incident light is completely reflected in the light guide plate. When an object touches the touch plane, a total internal reflection of at least a portion of the incident light at a touch point is frustrated. The light sensing module detects a wavelength of an ambient light. The controller controls the light emitting device according to the ambient light wavelength detected by the light sensing module to adjust an incident light wavelength of the incident light emitted by the light emitting device so that the incident light wavelength differs from the ambient light wavelength.

18 Claims, 2 Drawing Sheets

TOUCH PANEL, TOUCH DEVICE USING THE SAME, AND TOUCH CONTROL METHOD

This application claims the benefit of Taiwan application Serial No. 102118147, filed May 23, 2013, the subject matter of which is incorporated herein by reference.

BACKGROUND OF THE INVENTION

1. Field of the Invention

The invention relates in general to a touch panel, a touch device using the same, and a touch control method, and more particularly to a touch panel in which a wavelength for a light emitting device is adjustable, a touch device using the same, and a touch control method.

2. Description of the Related Art

Currently, the touch control methods available in the market can be categorized into resistive, capacitive, electromagnetic, and optical types, and so on. The capacitive touch control conventionally employs a camera to sense the touch position for an object. For example, when a finger of a user touches a touch plane, the camera equipped under the touch plane detects the shape of the finger, and a processor recognizes a corresponding touch event according to the detection result.

In this way, how to improve the accuracy of the detection result in a touch device and touch control method becomes a topic for the industry to engaging in.

SUMMARY OF THE INVENTION

The invention is directed to a touch panel in which a wavelength for a light emitting device is adjustable, a touch device using the same, and a touch control method, thus enhancing the accuracy of the touch control.

According to an aspect of the invention, a touch panel is provided. The touch panel includes a light guide plate, a light emitting device, a light sensing module, and a controller. The light guide plate has a touch plane. The light emitting device is used for applying an incident light to the light guide plate, and at least a portion of the incident light is completely reflected in the light guide plate, wherein when an object touches the touch plane, a total internal reflection of at least a portion of the incident light at a touch point is frustrated. The light sensing module is used for detecting a wavelength of an ambient light. The controller is used for controlling the light emitting device according to the ambient light wavelength detected by the light sensing module to adjust an incident light wavelength of the incident light emitted by the light emitting device so that the incident light wavelength differs from the ambient light wavelength.

According to an aspect of the invention, provided is a touch device for detecting a position where a touch event is triggered. The touch device includes a light guide plate, a light emitting device, a light sensing module, a controller, and a camera module. The light guide plate has a touch plane. The light emitting device is used for applying an incident light to the light guide plate, and at least a portion of the incident light is completely reflected in the light guide plate, wherein when an object touches the touch plane, a total internal reflection of at least a portion of the incident light at the touch position is frustrated. The light sensing module is used for detecting a wavelength of an ambient light. The controller is used for controlling the light emitting device according to the ambient light wavelength detected by the light sensing module to adjust an incident light wavelength of the incident light emitted by the light emitting device so that the incident light wavelength differs from the ambient light wavelength. The camera module is used for acquiring a light from the light guide plate when the total internal reflection of the at least a portion of the incident light is frustrated so as to detect the position where the touch event is triggered.

According to an aspect of the invention, a touch control method for detecting a position for a touch event to be triggered in a touch device is provided. The method includes the following steps. First, an incident light is applied to the light guide plate, wherein the light guide plate has a touch plane; at least a portion of the incident light is completely reflected in the light guide plate; when an object touches the touch plane to trigger the touch event, a total internal reflection of at least a portion of the incident light at a touch point is frustrated. A wavelength of an ambient light is then detected. An incident light wavelength of the incident light is adjusted according to the detected ambient light wavelength so that the incident light wavelength differs from the ambient light wavelength. A light from the light guide plate is acquired when the total internal reflection of the at least a portion of the incident light is frustrated so as to detect the position where the touch event is triggered.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
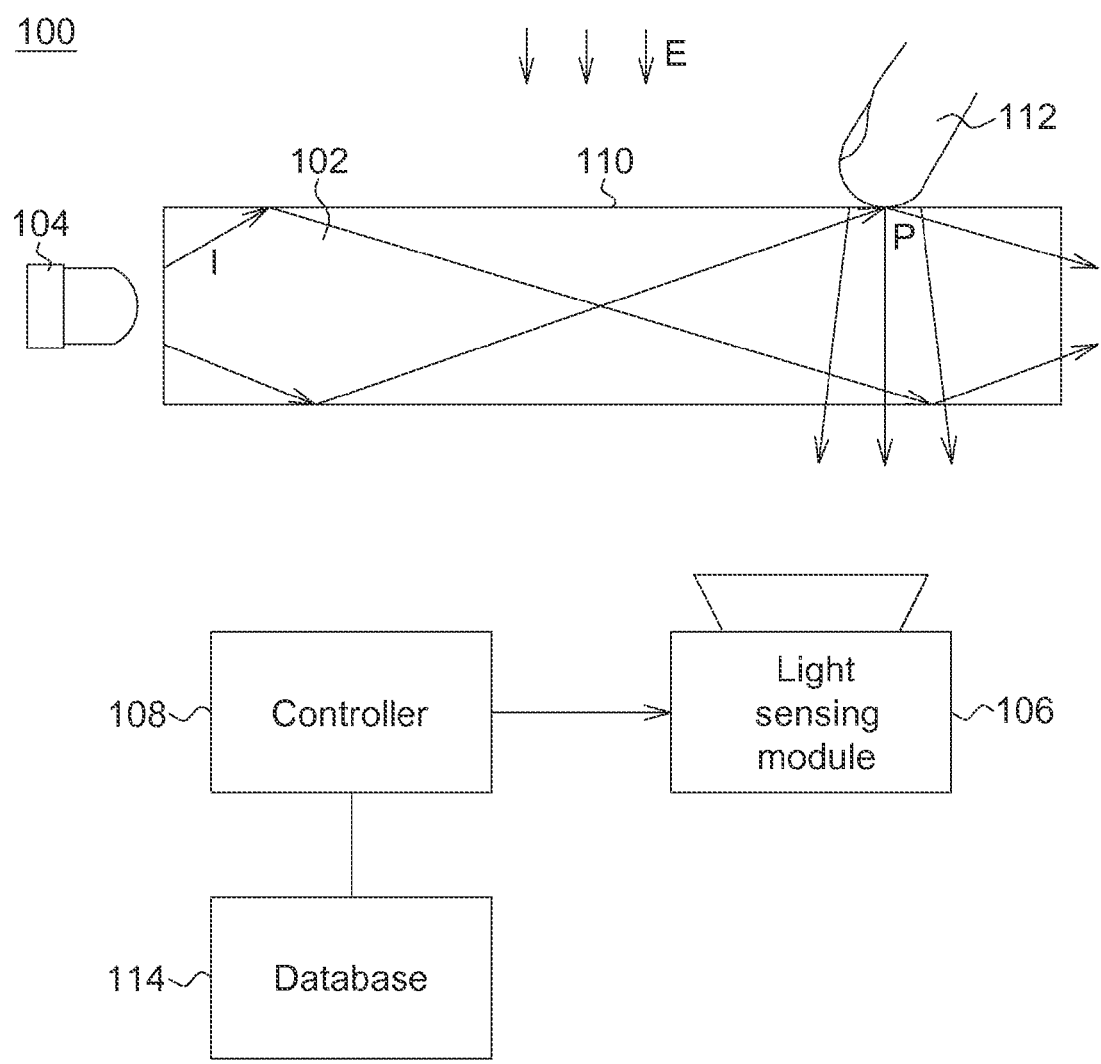
FIG. 1 is a cross-sectional view showing a touch panel according to an embodiment.

FIG. 1 is a cross-sectional view showing a touch panel according to an embodiment. A touch panel 100 includes a light guide plate 102, a light emitting device 104, a light sensing module 106, and a controller 108. The light guide plate 102 has a touch plane 100. The light emitting device 104 is utilized for applying an incident light I to the light guide plate 102. At least a portion of the incident light I is completely reflected in the light guide plate 102. When an object touches the touch plane 110, a total internal reflection of at least a portion of the incident light I in a place P where the touch occurs is frustrated. The light sensing module 106 is used for detecting an ambient light wavelength of an ambient light E. The controller 108 is employed for controlling the light emitting device 104 according to the ambient light wavelength detected by the light sensing module 106 to adjust an incident light wavelength of the incident light I emitted by the light emitting device 104 so that the incident light wavelength differs from the ambient light wavelength.

The applicant found that the conventional optical touch control may be affected by the ambient light, especially when the ambient light wavelength of the ambient light is similar to the wavelength of the incident light of the light emitting device 104. In the worse case, it may result in a situation that the touch position cannot be detected. The touch panel 100 according to the embodiment can change the wavelength of the incident light of the light emitting device 104, thus effectively avoiding the influence of the ambient light on the optical touch plate and enhancing the accuracy of touch recognition.

In the embodiment, the light guide plate 102, for example, is a glass plate or other component constructed by a light guiding material. The light emitting device 104 is an adjustable light source, such as an RGB light emitting diode. The light sensing module 106, for example, is a light sensor or a proximity sensor. The controller 108 is a microprocessor or other component capable of computing and outputting control signals according to the computation result, for example.

The light emitting device 104 is disposed on at least one side of the light guide plate 102, for example, and can apply the incident light to the light guide plate 102. When an object 112 (e.g., a finger of a user or a stylus) touches the touch plane 110, the condition for total internal reflection on the touch plane 110 is changed since the refraction index of the object 112 is different from that of the air. As such, the total internal reflection of at least one portion of the incident light I does not occur at the touch position P, thus leading to at least one portion of the incident light I scattered or refracted.

The light sensing module 106, for example, is disposed inside the touch panel 100 (e.g., under the light guide plate 102), and can detect the ambient light wavelength of the ambient light E. The ambient light may be the natural light (such as sunlight, moonlight), artificial light (such as candlelight, white, or other color light, and so on) or the combination thereof, for example. As an example, an orange sunset light is taken as the ambient light E. When the ambient light E is emitted on the touch panel 100, the light sensing module 106 senses the ambient light E and determines that its wavelength indicating wavelength of the visible light of orange with wavelengths between 610 nm to 617 nm, for example. In one embodiment, setting the sensing range for the light sensing module 106 can be done as to control the light sensing module 106 to sense the light wavelength for a specific range (e.g., a range for visible lights).

In one embodiment, the light sensing module 106 may emit a detection light beam to detect whether there is any object approaching within a distance (e.g., 15 cm) and, when an object approaching is detected, output a driving signal to wake up related components so as to save the power dissipation of the touch panel 100. For example, when the light sensing module 106 does not detect that the object 112 approaches the touch plane 110, the controller 108 or the light emitting device 104 may be in a sleep mode or a shutdown state; when the light sensing module 106 detects that the object 112 approaches the touch plane 110, the light sensing module 106 wakes up the controller 108 or the light emitting device 104. In another example, when the light sensing module 106 does not detect that the object 112 approaches the touch plane 110, both the controller 108 and the light emitting device 104 may be in the sleep mode or the shutdown state; when the light sensing module 106 detects that the object 112 approaches the touch plane 110, the light sensing module 106 wakes up the controller 108 and the light emitting device 104.

The controller 108 may control the light emitting device 104 according to the ambient light wavelength detected by the light sensing module 106 to adjust the incident light wavelength of the incident light I emitted by the light emitting device 104, thus causing the incident light wavelength to be different from the ambient light wavelength. For example, it is supposed that the ambient light wavelength detected by the light sensing module 106 is between about 610 nm to 617 nm (e.g., the orange sunset light), and the controller 108 adjusts the light emitting device 104 to make the light emitting device 104 emit an incident light I with wavelength different from the ambient light wavelength from 610 nm to 617 nm, such as an incident light I of blue (wavelength from about 455 nm to 480 nm). In this way, when the object 112 touches the touch plane 110, the incident I that is scattered or refracted because of the frustration of the total internal reflection differs from the ambient light E so that the backend sensing components can clearly recognize the touch position of the object 112 (e.g., the touch position P), avoiding misjudgment due to the influence of the ambient light. Further, the backend sensing components may make a determination with respect to the blue light (incident light I), and the accuracy of the touch recognition may be enhanced effectively because the blue light significantly contrasts with the orange sunset light (ambient light E).

In one embodiment, the touch panel 100 further includes a database for storing a plurality of adjustment data. In addition, the controller 108 selects the incident light wavelength of the incident light according to the ambient light wavelength of the ambient light E and the adjustment data so that the difference between the incident light wavelength and the ambient light wavelength is greater than a threshold. The adjustment data of the database 114 are stored, for example, in the form of a look-up table, which stores wavelengths of a number of types of ambient lights and corresponding adjusted incident light wavelengths. For example, it is supposed that the threshold is 100 nm; when the ambient light wavelength is 650 nm (corresponding to the wavelength of a visible red light), the corresponding adjusted incident light wavelength is 530 nm (corresponding to the wavelength of a visible green light); when the ambient light wavelength is 550 nm (corresponding to the wavelength of a visible yellow light), the corresponding adjusted incident light wavelength is 400 nm (corresponding to the wavelength of a visible purple light). In this way, the controller 108 can select the corresponding adjusted incident light wavelength according to the ambient light wavelength and the adjustment data, for example, by way of looking up the table, so that the difference between the adjusted incident light wavelength and the ambient light wavelength is greater than the threshold. It is noted that the implementation is not limited thereto, and the adjustment data can be generated by algorithm or another approach, such as an approach that can record the adjusted incident light wavelengths corresponding to different ambient light wavelengths, or an approach that can generate the adjusted incident light wavelengths according to the ambient light wavelength of an ambient light. In addition, the controller 108 can also select a wavelength value directly from an adjustable wavelength range (e.g., a range of visible light wavelengths) of the light emitting device 104 as the incident light wavelength of the incident light I so that the difference between the selected wavelength value and the ambient light wavelength of the ambient light E is maximal.

Figure 2:
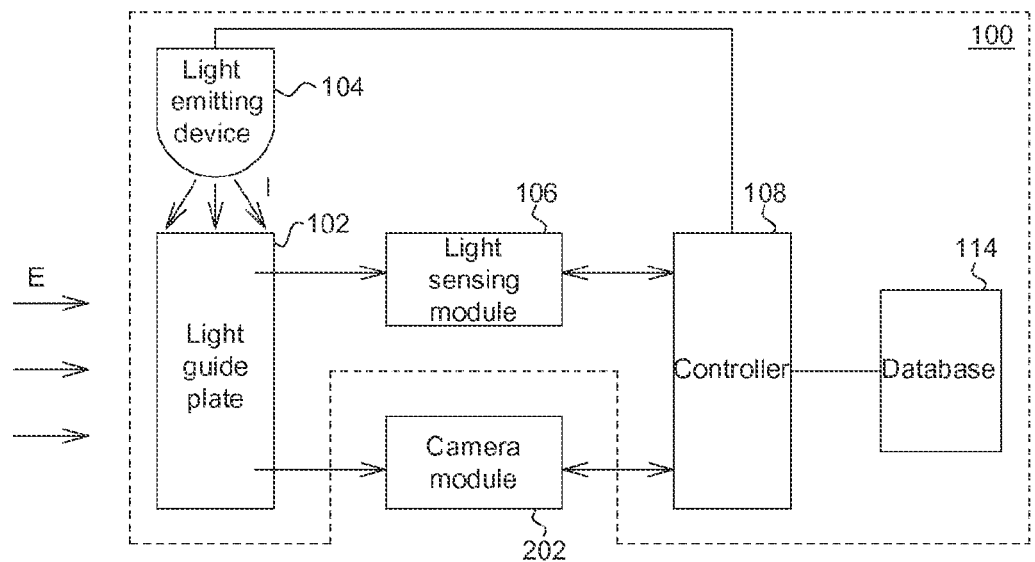
FIG. 2 is a block diagram showing a touch panel according to an embodiment.

FIG. 2 is a block diagram showing a touch panel according to an embodiment. The touch device 200 includes the touch panel 100 as shown in FIG. 1 and a camera module 202. As above described, the touch panel 100 includes the light guide plate 102, the light emitting device 104, the light sensing module 106, and the controller 108. The camera module 202 is utilized for acquiring a light from the light guide plate 102 when the total internal reflection of the at least a portion of the incident light I is frustrated so as to detect the position where the touch event is triggered.

For example, it is supposed that the incident light I emitted from the light emitting device 104 is a blue light; and when the object 112 touches the touch plane 110 and slides, the camera module 202 can acquire a light from the light guide plate 102 when the total internal reflection of at least one portion of the incident light I is frustrated so as to detect a touch trace formed by the blue light. Since the wavelength of the touch trace or touch point detected by the camera module 202 differs from the ambient light wavelength, the controller 108 can clearly recognize the touch trace or touch point of the object 112 according to the detection result of the camera module 202, and multiple points can also be detected. In one example, the camera module 202 can be set to only acquire light rays corresponding to the wavelength of the incident light. In addition, the camera module 202, in normal operation, can be in the sleep mode or the shutdown state, and can be woken up when the light sensing module 106 detects that the object 112 approaches.

The camera module 202 is a fixed-focus camera or any device capable of sensing images, for example. For the camera module 202 being a fixed-focus camera, for example, the touch device 200 can be made without a zoom motor, thus saving the manufacturing cost and the power dissipation for zooming.

Figure 3:
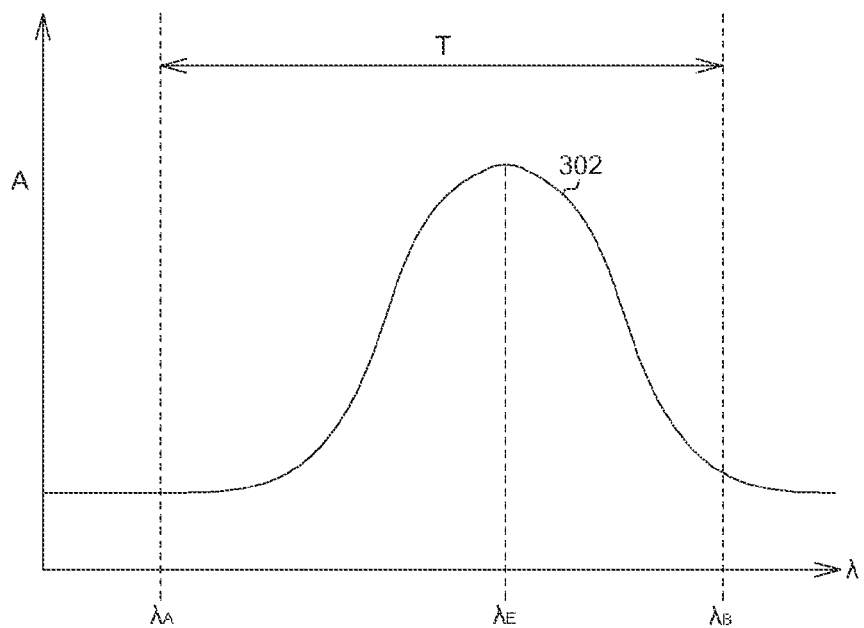
FIG. 3 illustrates an example of a spectrum for an ambient light.

FIG. 3 illustrates an example of a spectrum for an ambient light. A curve 302 represents the relationship between the wavelength A and light component intensity A, indicating the spectrum for the ambient light E. In FIG. 3, the light component intensity A of the wavelength $\lambda_E$ is maximal. In this case, the wavelength $\lambda_E$ can be regarded as the wavelength of the ambient light E. In other words, the wavelength corresponding to the maximum value of the ambient light E can be selected as the ambient light wavelength (such as wavelength $\lambda_E$).

Referring to FIG. 3, it is supposed that an interval from wavelengths $\lambda_A$ to $\lambda_B$ is an adjustable wavelength range T of the light emitting device 104. In this example, the wavelength $\lambda_A$ is the farthest wavelength from the wavelength $\lambda_E$ (i.e., the difference between the wavelength $\lambda_A$ and the ambient light wavelength $\lambda_E$ is maximal within the interval T). In one embodiment, the controller 108 can be implemented to directly select wavelength $\lambda_A$ as the incident light wavelength of the incident light I so as to effectively make the incident light I differ from the ambient light E.

In one embodiment, the controller 108 recognizes the position of the touch event detected by the camera module 202. When the controller 108 fans to determine the position of the touch event detected by the camera module 202 within a period of time, the controller 108 can change the wavelength of the incident light I to another wavelength differing from the ambient light wavelength E.

For example, if water suddenly drips onto the touch plane 110 and blurs the touch trace, the controller 108 may fail to determine the touch trace within a period of time. In this case, the controller 108 can change the wavelength of the incident light I to another wavelength differing from the wavelength of the ambient light E until the controller 108 can recognize the touch trace. In another example, if the controller 108 fails to determine the touch trace, the controller 108 may send an indication to request the user for entering the touch event again. In another example, if the controller 108 cannot determine the touch trace successfully, the controller 108 may display the detected touch trace (such as the user's signature) or touch points on the screen in order for the user to confirm it and in order to determine whether to require the user to enter it again. In this way, the controller 108 can enhance the touch recognition by adjusting the incident light wavelength even if the incident light wavelength of the incident light I differs from the ambient light wavelength of the ambient light E. Thus, the controller 108 can overcome the influence of the non-ambient light by adjusting the incident light wavelength.

In one embodiment, the controller 108 can adjust the incident light wavelength of the incident light I according to a user external signal. For example, the touch device 200 may provide a variety of situation modes (such as: indoor mode, outdoor mode, evening mode, and so on) for the user to select, where each situation mode corresponds to a preset incident light. When the user selects one of the situation modes and a corresponding user external signal is generated, the controller 108 can adjust the light emitting device 104 according to the user external signal so that the light emitting device 104 emits an incident light I with the corresponding preset incident light wavelength.

In other embodiments, a touch control method for detecting a position for a touch event to be triggered in a touch device. The method includes the following steps. First, an incident light is applied to the light guide plate, wherein the light guide plate has a touch plane; at least a portion of the incident light is completely reflected in the light guide plate; when an object touches the touch plane to trigger the touch event, a total internal reflection of at least a portion of the incident light at a touch point is frustrated. An ambient light wavelength of an ambient light is then detected. An incident light wavelength of the incident light is adjusted according to the detected ambient light wavelength so that the incident light wavelength differs from the ambient light wavelength. A light from the light guide plate is acquired when the total internal reflection of the at least a portion of the incident light is frustrated so as to detect the position where the touch event is triggered.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A touch panel, comprising:
   a light guide plate having a touch plane;
   a light emitting device for applying an incident light to the light guide plate, at least a portion of the incident light being completely reflected in the light guide plate, wherein when an object touches the touch plane, a total internal reflection of at least a portion of the incident light at a touch point is frustrated;
   a light sensing module for detecting an ambient light wavelength of an ambient light;
   a controller for controlling the light emitting device according to the ambient light wavelength detected by the light sensing module to adjust an incident light wavelength of the incident light emitted by the light emitting device so that the incident light wavelength differs from the ambient light wavelength; and
   a database for storing a plurality of adjustment data;
   wherein the controller selects the incident light wavelength of the incident light according to the ambient light wavelength and the adjustment data so that a difference between the incident light wavelength and the ambient light wavelength is greater than a threshold.

2. The touch panel according to claim 1, wherein the incident light corresponds to an adjustable wavelength range; and the controller selects a wavelength value from the adjustable wavelength range as the incident light wavelength of the incident light so that a difference between the selected wavelength value and the ambient light wavelength is maximal.

3. The touch panel according to claim 1, wherein when the light sensing module detects that the object approaches the touch plate, the light sensing module wakes up the controller, which, before woken up, is in a sleep mode or a shutdown state.

4. The touch panel according to claim 1, wherein when the light sensing module detects that the object approaches the touch plate, the light sensing module wakes up the light emitting device, which, before woken up, is in a sleep mode or a shutdown state.

5. The touch panel according to claim 1, wherein the controller adjusts the incident light wavelength of the incident light according to a user external signal.

6. The touch panel according to claim 1, wherein the light sensing module is a proximity sensor.

7. A touch device for detecting a position where a touch event is triggered, the touch device comprising:
a light guide plate having a touch plane;
a light emitting device for applying an incident light to the light guide plate, at least a portion of the incident light being completely reflected in the light guide plate, wherein when an object touches the touch plane to trigger the touch event, a total internal reflection of at least a portion of the incident light is frustrated at a place where the touch occurs;
a light sensing module for detecting an ambient light wavelength of an ambient light;
a controller for controlling the light emitting device according to the ambient light wavelength detected by the light sensing module to adjust an incident light wavelength of the incident light emitted by the light emitting device so that the incident light wavelength differs from the ambient light wavelength;
a camera module for acquiring a light from the light guide plate when the total internal reflection of the at least a portion of the incident light is frustrated so as to detect the position where the touch event is triggered; and
a database for storing a plurality of adjustment data;
wherein the controller selects the incident light wavelength of the incident light according to the ambient light wavelength and the adjustment data so that a difference between the incident light wavelength and the ambient light wavelength is greater than a threshold.

8. The touch device according to claim 7, wherein the incident light corresponds to an adjustable wavelength range; and the controller selects a wavelength value from the adjustable wavelength range as the incident light wavelength of the incident light so that a difference between the selected wavelength value and the ambient light wavelength is maximal.

9. The touch device according to claim 7, wherein the controller recognizes a position that the camera module detects as the position where the touch event is triggered; when the controller, within a period of time, cannot recognize the position that the camera module detects as the position where the touch event is triggered, the controller changes the incident light wavelength of the incident light to another wavelength different from the ambient light wavelength.

10. The touch device according to claim 7, wherein when the light sensing module detects that the object approaches the touch plate, the light sensing module wakes up the controller and the camera module, which, before woken up, are in a sleep mode or a shutdown state.

11. The touch device according to claim 7, wherein when the light sensing module detects that the object approaches the touch plate, the light sensing module wakes up the light emitting device, which, before woken up, is in a sleep mode or a shutdown state.

12. The touch device according to claim 7, wherein the controller adjusts the incident light wavelength of the incident light according to a user external signal.

13. The touch device according to claim 7, wherein the light sensing module is a proximity sensor.

14. A touch control method, for detecting a position where a touch event is triggered in a touch device, the touch control method comprising:
applying an incident light to the light guide plate, wherein the light guide plate has a touch plane; at least a portion of the incident light is completely reflected in the light guide plate; when an object touches the touch plane to trigger the touch event, a total internal reflection of at least a portion of the incident light at a place where the touch occurs is frustrated;
detecting an ambient light wavelength of an ambient light;
adjusting an incident light wavelength of the incident light according to the detected ambient light wavelength so that the incident light wavelength differs from the ambient light wavelength;
acquiring a light from the light guide plate when the total internal reflection of the at least a portion of the incident light is frustrated so as to detect the position where the touch event is triggered; and
selecting the incident light wavelength of the incident light according to the ambient light wavelength and a plurality of adjustment data stored in a database so that a difference between the incident light wavelength and the ambient light wavelength is greater than a threshold.

15. The touch control method according to claim 14, further comprising:
selecting a wavelength value from an adjustable wavelength range corresponding to the incident light so that a difference between the selected wavelength value and the ambient light wavelength is maximal.

16. The touch control method according to claim 14, wherein the touch device includes a controller for adjusting the incident light wavelength of the incident light, the touch control method further comprises:
when it is detected that the object approaches the touch plate, waking up the controller, which, before woken up, is in a sleep mode or a shutdown state.

17. The touch control method according to claim 14, wherein the touch device includes a light emitting device for applying the incident light to the light guide plate, the touch control method further comprises:
when it is detected that the object approaches the touch plate, waking up the light emitting device, which, before woken up, is in a sleep mode or a shutdown state.

18. The touch control method according to claim 14, wherein the touch device includes a camera module for acquiring a light from the light guide plate when the total internal reflection of the at least a portion of the incident light is frustrated, the touch control method further comprises:
when it is detected that the object approaches the touch plate, waking up the camera module, which, before woken up, is in a sleep mode or a shutdown state.

* * * * *